July 20, 1971 C. E. SMITH ET AL 3,594,148
REFRACTORY TANK STRUCTURE FOR FLOATING GLASS ON
MOLTEN METAL
Filed May 20, 1968
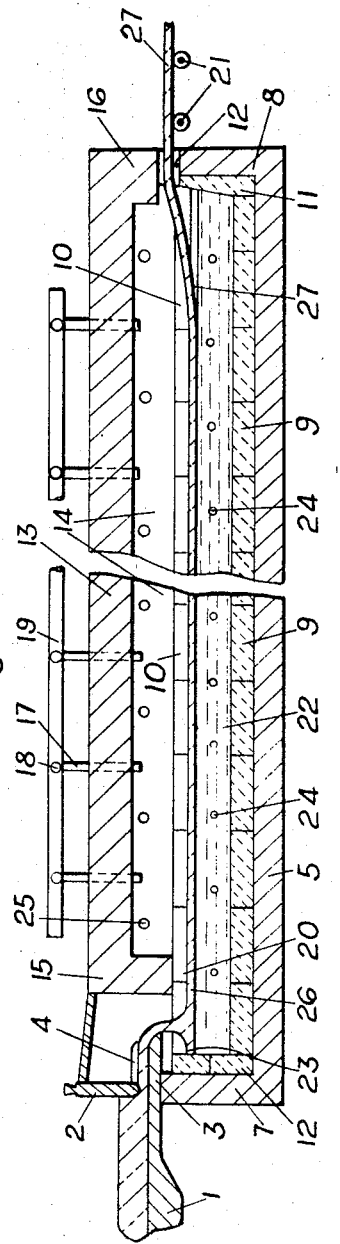
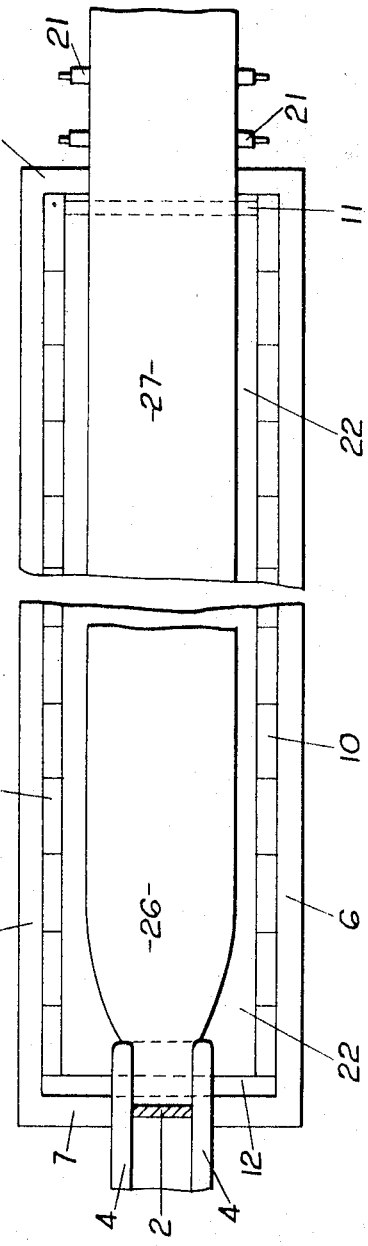

United States Patent Office 3,594,148
Patented July 20, 1971

3,594,148
REFRACTORY TANK STRUCTURE FOR FLOATING GLASS ON MOLTEN METAL
Charles Elwyn Smith, Ormskirk, and Ian William McKittrick, Hythe, England, assignors to Pilkington Brothers Limited, Liverpool, Lancashire, England
Filed May 20, 1968, Ser. No. 730,312
Claims priority, application Great Britain, May 25, 1967, 24,344/67
Int. Cl. C03b 18/02
U.S. Cl. 65—182
6 Claims

ABSTRACT OF THE DISCLOSURE

In the float process for the manufacture of flat glass, the tank structure containing a molten metal bath is lined with an alumino-silicate refractory.

BACKGROUND OF THE INVENTION

(1) Field of the invention

This invention relates to the manufacture of flat glass and in particular to methods and apparatus for the manufacture of flat glass in which glass in ribbon form is advanced along a bath of molten metal, for example a bath of molten tin or of a tin alloy in which tin predominates and which has a specific gravity greater than that of the glass.

(2) Description of the prior art

A molten metal bath having the desired characteristics is preferably constituted as described in U.S. Patent No. 2,911,759. Usually the tank structure containing the bath of molten metal is formed of refractory blocks which are held in an outer metal casing, and it has been found that glassy accretions may develop on the surfaces of the blocks retaining the molten metal bath. These accretions, if they become detached from the tank structure at the high temperatures involved, particularly at the hotter inlet end of the tank structure where glass is being delivered to the bath and the temperature may be in the region of 1,000° C., may rise to the bath surface where their presence could be detrimental to the operation of the process.

This invention is based on the discovery that such glassy accretions do not occur if the refractory lining for the tank structure has a composition such that it does not exhibit undesirable glass-forming properties with any element present in the molten metal of the bath at the temperature of operation.

It is a main object of the present invention to employ that discovery in minimising or preventing the formation of glassy materials at the interface of the molten metal bath with the refractory material of the tank structure which retains the bath.

SUMMARY

According to the invention, apparatus for use in the manufacture of flat glass comprises an elongated tank structure containing a bath of molten metal over which glass in ribbon form is advanced, the tank structure being lined with an alumino-silicate refractory comprising from 40% to 80% alumina and from 20% to 55% silica.

Preferably according to the invention the refractory contains not more than 1% of alkali, expressed as the oxide.

It is also desirable that the iron oxide content of the refractory, expressed as $Fe_2O_3$, is less than 1.0%, preferably less than 0.5%.

The lining of the tank structure extends over the whole of the floor and the side walls and front and end walls of the tank structure where that tank structure is contacted by the molten metal of the bath. The lining of the walls of he tank structure may extend only to the surface level of the bath of molten metal contained in the tank structure but desirably the lining of the walls of the tank structure extends upwardly from thel ined floor and above the surface level of the molten metal bath.

The application of a negative pressure around the outside of the refractory lining is advantageous under some conditions of operation, and when operating in this way a controlled porosity of the refractory is desirable.

In one embodiment the refractory has evenly distributed pores having a uniform size distribution which is linear over the range 0.02 to 100 microns.

Alternatively according to the invention the refractory has pores the diameters of which are non-uniformly distributed but more than 25% of the volume of the pores consists of pores greater than 5 microns in diameter.

The invention also comprehends a method of manufacturing flat glass during which the glass is in contact with molten metal, characterised by retaining the molten metal by means of a surface of alumino-silicate refractory comprising from 40% to 80% alumina and from 20% to 55% silica.

BRIEF DESCRIPTION OF THE DRAWINGS

FIG. 1 is a central longitudinal sectional elevation of apparatus according to the invention, illustrated by way of example, comprising an elongated tank structure containing a bath of molten metal which tank structure has a refractory lining according to the invention, there being a superimposed roof structure over the tank structure, and FIG. 2 is a plan view of the apparatus of FIG. 1, but with the roof structure removed.

DESCRIPTION OF THE PREFERRED EMBODIMENT

Referring to the drawings, a forehearth of the continuous glass melting tank is indicated at 1 and a regulating tweel at 2. The forehearth ends in a spout comprising a lip 3 and side jambs 4. The side jambs 4 and lip 3 form a spout of generally rectangular cross-section. A cover may be secured over the spout in known manner. The spout 3, 4 is disposed above the floor 5 of a tank structure including side walls 6 joined together by end walls 7 and 8 integral with the side walls 6 and the floor 5. The floor 5, side walls 6 and end walls 7 and 8 form an outer casing for the tank structure which is lined with blocks of a refractory material which will be described in greater detail hereinafter.

Refractory lining blocks 9 cover the whole floor of the tank structure, and the refractory lining extends upwardly covering the side walls 6. The lining for the side walls is indicated at 10 and FIG. 1 shows how this lining extends up to the top of the level of the side walls of the tank strutcure. At the outlet end of the bath a shaped block 11 retains the bath of molten metal and extends through the surface of the bath of the level of an outlet 12 for the glass. Similarly at the inlet end of the tank structure the lining refractory block extends upwardly to above the surface level of the molten metal but does not extend so far as the bottom surface of the spout 3 which rests on the top of the inlet end wall 7.

A roof structure is supported on the tank structure and includes a roof 13, side walls 14 and end walls 15 and 16 respectively at the inlet and outlet end of the bath. The roof structure thus provides a tunnel over the bath and defines a headspace over the bath in which a protective atmosphere is maintained at a plenum. The roof structure 13 is at intervals provided with ducting 17 connected by branches 18 to headers 19 through which a protecting gas is fed into the headspace over the bath to create a plenum of protective gas in the substantially closed headspace. This gas which may include a reducing constituent, for example 5% of hydrogen, is mainly an inert gas for example nitrogen which will not react chemically with the metal of the bath to produce contaminants for the glass and therefore protects the exposed bath surface. Because the protective gas is maintained at a plenum in the headspace ingress of external atmosphere through the restricted inlet 20 below the end wall 15 of the roof structure and the outlet 12 is substantially prevented.

Driven conveying rollers 21 are mounted outside the outlet end of the tank structure and are disposed above the level of the top of the end wall 8 and the rollers 21 apply tractive effort to the ribbon of glass which is moving along the bath towards the outlet from the bath. The ribbon is directed by the rollers to a conventional tunnel lehr in which the ribbon is annealed as is well understood in the art.

Molten glass is poured on to the bath 22 of molten metal contained in the tank structure from the spout 3, 4. The tweel 2 regulates the flow of molten glass from the spout lip 4 and the spout is vertically spaced from the surface of the bath so that the molten glass has a free fall of a few inches to the bath which distance is such as to ensure a heel 23 of molten glass being formed behind the glass falling from the spout which heel extends rearwardly to the lining 12 of the inlet end wall 7 of the tank structure. The lining extends above the upper surface of the heel 23.

The temperature of the bath is regulated from the inlet end to the discharge end by providing thermal regulators 24 immersed in the bath 22 and radiant heaters indicated at 25 are mounted in the headspace over the advancing ribbon of glass. The temperature regulators at the inlet end of the bath are designed and operated to maintain the temeprature at about 1,000° C. or slightly higher over a sufficient length of the bath to ensure that the molten glass is advanced along the bath as a buoyant layer of molten glass from which is developed a buoyant body of molten glass 26. The width of the tank structure between the inner faces of the lining 10 of the side walls is greater than the width of the buoyant body 26 at the surface level of the bath so that the buoyant layer is able to flow freely laterally unhindered to the limit of its free flow and the glass is then advanced in ribbon form along the bath and is cooled as it is advanced by the operation of the temperature regulators 24 and 25 until it reaches a temperature of about 600° C. before being taken up off the bath surface at the outlet end of the bath by the conveying rollers 21 as shown in FIG. 1. The ribbon of glass developed from the buoyant body of molten glass at the inlet end of the bath is indicated at 27. It is this ribbon which is discharged from the bath on the conveying rollers 21 to an annealing lehr.

Preferably the bath of molten metal is a bath of molten tin but other constitutions of the bath may be employed. For example a tin alloy having a specific gravity greater than that of the glass. Further a trace of an additive element may be maintained in the molten metal to react with any impurities entering the molten meal, for example oxygen and sulphur either from the glass delivered to the bath or from the headspaces over the bath.

The improved lining of the tank structure according to the invention is of an alumino-silicate refractory which forms the blocks 9, 10, 11 and 12 lining respectively the floor, side walls and endwalls of the tank structure of form a complete lining for that part of the tank structure which holds the bath of molten metal. Thus the molten metal of the bath is retained by means of a complete surface of the alumino-silicate refractory.

The refractory blocks are made from a material having a high alumina content which is at least 40% of alumina and may be as much as 80%. The silica content of the refractory is low and the maximum permissible percentage of silica in the composition of the refractory is 55%. A range of from 20% to 55% of silica in the refractory have been found to be effective, which silica is present in the refractory in the bound form of a silicate.

In some applications it is a desirable property of the refractory that it shall not contain free silica and this is brought about by ensuring that the refractory is made from material e.g. a clay which does not contain free silica.

Another important property of the refractory constituting the lining blocks is that it should not contain more than 1% of alkali, expressed as the oxides of the alkali metals, usually sodium or potassium oxide.

A refractory material of this nature has been selected for use as the refractory lining for the tank structure containing the bath of molten metal because such high alumina refractories have been discovered not to exhibit undesirable glass forming properties with elements present in the molten metal bath, for example sodium which may enter the molten metal of the bath from the glass advancing along the bath. Alkali in the refractory might operate in a glass forming process in the way of a flux, and for the same reason it is desirable that the iron oxide content, expressed as $Fe_2O_3$, of the refractory shall be less than 1.0% and preferably less than 0.5%. According to a further feature, the alumina content may be reduced by substitution of zirconium silicate in place of part of the alumino-silicate.

The refractory may have specially selected porosity characteristics. For example if pores are evenly distributed through the refractory they have a uniform size distribution which is linear over a range of the order of 0.02 micron to 100 microns. If the diameters of the pores are non-uniformly distributed, more than 25% of the volume of the pores consist of pores greater than 5 microns in diameter.

A porous refractory lining for the tank structure which is so constituted according to the invention is particularly advantageous when a negative pressure is applied around the refractory structure containing the molten metal bath, for example by applying suction to an interspace defined between the refractory lining blocks 9, 10, 11 and 12 and the outer casings 5, 6, 7 and 8 of the tank structure.

The provision of the lining for the tank structure avoids any tendency for the formation of glassy accretions on the floor or side walls of the tank structure where contacted by the molten metal of the bath and even if an element enters the molten metal of the bath which element, at the operating temperature, tends to form a glass with materials in the customary refractories, the provision of the special refractory lining according to the invention prevents or minimises glass forming conditions obtaining at the interface between the molten metal of the bath and the tank structure containing the bath.

We claim:

1. Apparatus for use in the manufacture of flat glass comprising an elongated tank structure containing a bath of molten metal over which glass in ribbon form is advanced, the tank structure comprising an outer casing lined with a permeable alumino-silicate refractory comprising from 45% to 80% alumina, and from 20% to 55% silica, which permeable refractory has evenly distributed pores having a uniform size distribution which is linear over the range 0.02 to 100 microns, and means for applying suction to an interspace existing between said lining and outer casing.

2. Apparatus according to claim 1, wherein the refractory contains not more than 1% of alkali, expressed as the oxide.

3. Apparatus according to claim 1, wherein the iron oxide content of the refractory, expressed as $Fe_2O_3$, is less than 1.0%.

4. Apparatus according to claim 3, wherein the iron oxide content of the refractory is less than 0.5%.

5. Apparatus according to claim 1, wherein the lining of the walls of the tank structure extends upwardly from the lined floor and above the surface level of the molten metal bath.

6. Apparatus according to claim 1, wherein the refractory has pores the diameters of which are non-uniformly distributed but more than 25% of the volume of the pores consists of pores greater than 5 microns in diameter.

References Cited

UNITED STATES PATENTS

| | | | |
|---|---|---|---|
| 3,218,141 | 11/1965 | Lambert | 65—182X |
| 3,428,444 | 2/1969 | Swillinger | 65—99 |

OTHER REFERENCES

Special Refractories, by William H. Henson, pp. 64 to 70 of the May 1947 issue of the "American Foundryman."

ARTHUR D. KELLOGG, Primary Examiner

U.S. Cl. X.R.

65—374; 266—43